United States Patent [19]

Haycock et al.

[11] Patent Number: 4,764,809
[45] Date of Patent: Aug. 16, 1988

[54] APPARATUS AND METHOD FOR PRODUCING A VARIETY OF VIDEO WIPE BORDERS

[75] Inventors: David A. Haycock, Lakewood; Jay L. Flora, Boulder, both of Colo.

[73] Assignee: Ampex Corporation, Redwood City, Calif.

[21] Appl. No.: 933,725

[22] PCT Filed: Mar. 14, 1986

[86] PCT No.: PCT/US86/00513

§ 371 Date: Nov. 12, 1986

§ 102(e) Date: Nov. 12, 1986

[87] PCT Pub. No.: WO86/05645

PCT Pub. Date: Sep. 25, 1986

Related U.S. Application Data

[63] Continuation-in-part of Ser. No. 712,494, Mar. 15, 1985, abandoned.

[51] Int. Cl.⁴ .................................................. H04N 5/272
[52] U.S. Cl. ........................................ 358/183; 358/182
[58] Field of Search ............... 358/183, 22, 182, 180; 340/728

[56] References Cited

U.S. PATENT DOCUMENTS

| Re. 29,600 | 3/1978 | Tkacenko | 358/183 |
|---|---|---|---|
| 3,941,925 | 3/1976 | Busch et al. | 178/6.8 |
| 3,944,731 | 3/1976 | Busch | 178/6.8 |
| 3,989,888 | 11/1976 | Busch et al. | 358/182 |
| 4,117,512 | 9/1978 | Miyake et al. | 358/183 |
| 4,121,253 | 10/1978 | McCoy | 358/183 X |
| 4,205,346 | 5/1980 | Ross | 358/181 |
| 4,238,773 | 12/1980 | Tsuboka et al. | 358/183 |
| 4,356,511 | 10/1982 | Tsujimura | 358/182 X |
| 4,392,156 | 7/1983 | Duca et al. | 358/183 |
| 4,694,343 | 9/1987 | Flora | 358/183 |
| 4,694,344 | 9/1987 | Flora | 358/183 |
| 4,698,666 | 10/1987 | Lake, Jr. et al. | 358/22 |

OTHER PUBLICATIONS

Fundamentals of Interactive Computer Graphics, Foley, Van Dan, Chap. 7, pp. 245-249.

Primary Examiner—James J. Groody
Assistant Examiner—E. Anne Faris
Attorney, Agent, or Firm—Bradley A. Perkins; George B. Almeida; Richard P. Lange

[57] ABSTRACT

An apparatus and method for generating waveform signals for the production of a variety of borders for video wipes by varied processing of the output of a ramp generator.

9 Claims, 2 Drawing Sheets

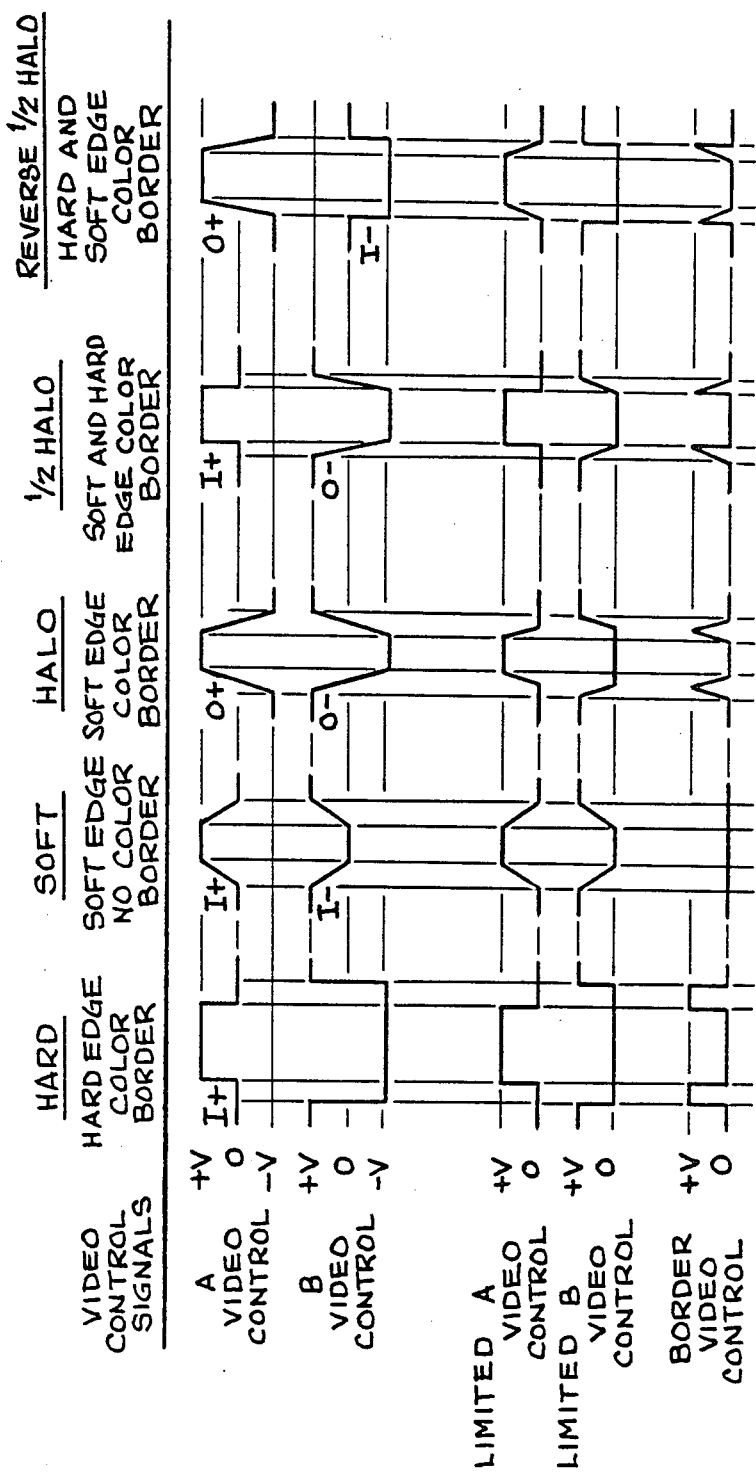
FIG_2

APPARATUS AND METHOD FOR PRODUCING A VARIETY OF VIDEO WIPE BORDERS

This is the National Application of PCT application PCT/US86/00513 filed on Mar. 14, 1986, which is a continuation-in-part of copending application Ser. No. 712,494, filed Mar. 15, 1985 now abandoned.

This invention relates generally to the selective formation of an output video signal from at least two input video signals. This invention further relates to switching between video signals using a switching technique called a wipe, and more particularly to transition boundary of a wipe, called a border.

BACKGROUND OF THE INVENTION

A finished video presentation is rarely one continuous scene shot from one camera. More commonly, video presentations are a series of short scenes assembled together through an edit process to form the final presentation. Unlike motion picture film which is edited by physically cutting and splicing film segments together, video material is edited by electronically cutting and splicing together segments of video signals.

A video switcher is an electronic device used by the video industry to execute a form of editing wherein video material from a variety of sources are assembled into a finished video presentation. Video material is provided to the video switcher in the form of input video signals from a variety of video sources, such as video tape recorders, optical disk plays, and video cameras. The video switcher typically selects for presentation as an output video signal one or more of the input video signals from the available video sources. This selection is accomplished by switching from one input video signal to another signal, with the time of occurrence of the switch operator. This output video signal is utilized in a variety of ways, such as recording by a video tape recorder, displaying on a video monitor, or broadcasting to viewers.

This switch between input video sources can take many forms and often involves several different switching techniques. The most straight forward of the switching techniques is the simple switch between different video signal sources. In such switchers, the output of the switcher is instantaneously switched between the input video signals and only one of the input video signals is present at any one instant at the output of the switcher. To a viewer of the output signal displayed on a monitor or television receiver, the display changes instantaneously from one input video signal to the other different input video signal.

Another technique of effecting a switch between video sources is called a dissolve. A dissolve is a gradual transition between different video signals, with the different video signals appearing simultaneously in the output provided for display during part of the transition interval. The gradual transition is accomplished through adjustable video signal gain controllers, commonly variable attenuators, and a signal combiner, which additively combine and present to an output the gain adjusted video signals provided by the gain controllers. Usually, a dissolve begins with the output video signal being entirely composed of a first input video signal. At a rate determined by the operator, the gain on the first input video signal is reduced to zero, while the gain on a second input video signal is raised from zero to the level originally set for the first signal. To a viewer of the output signal displayed on a monitor, the picture based on the first input signal appears to dim, while the picture based on the second input video source appears very dim at first and then appears to brighten until only the picture based on the second input video source is visible. At the midpoint of the switch, both signals are at an equal gain of one half and the pictures resulting from the displays of the signals are both visible simultaneously on the monitor, each at one-half its normal brightness.

Yet another technique of effecting a switch between video sources is called a wipe. A wipe is created by the generating a control signal which is used by a video mixer to switch between input video signals on a line by line basis, such that a line of output video may be composed of parts of both input video signals. This control signal is usually based on the output of ramp generators which are processed by a ramp combiner, which manipulates the ramps and then combines them so as to form a variety of control signals. During a wipe, both input video signals are present in the output video signal. Unlike a dissolve, where both complete input signals, at reduced gains, are additively combined to form the output video signal, in a wipe both signals are used at full gain, but only part of each signal corresponding to spatial segments of a display are present in the output video signal. Generally, the input video signals do not coexist in the same display spatial segment corresponding to the part of the output video signal. This concept is better understood from the standpoint of viewing the display of the output signal on a monitor. The wipe often begins with a first input video signal, when displayed on a monitor, spatially occupying the entire display area of the monitor. As the wipe progresses, the second input video signal displaces the first input video signal, spatially, in part of the display area of the monitor. The area displaying the second input video signal grows according to a selected pattern as the area displaying the first input video signal reduces according to a corresponding pattern, with the patterns determined according to operator inputs. The wipe is completed when the display area on the monitor is entirely occupied by a display of the second input video signal.

A control signal is used to prevent coupling to the output, input video signals areas that are not to be displayed on the monitor. This control signal is simply turned on or off. When on, the input signal is coupled to the output, and when off, the input signal is prevented from being coupled to the output. Because one of the input video signals is presented at the output video signal of the switcher, the control signal for the first input video signal is the reverse of the control signal for the second input video signal.

An example of a simple wipe is the vertical line wipe. When viewed on a monitor, a transition boundary, in the form of a vertical line between display areas on the monitor, defines the separation between the displays of the the first and second input video signals. As the vertical line wipe is executed, this transition boundary moves horizontally across the display area wiping from a picture based on the first input video signal to a picture based on the second video input signal. It is the form that this transition boundary takes, that determines what type of wipe is executed. For example, circle wipes have transition boundaries that form the shape of a box and circle, respectively. The greater the variety of wipes a switcher can execute, the greater its value.

These wipes have in common a transition boundary between the displays of the two video signals. This boundary is commonly called a border. A border is generated by creating control signals for each video signal, that comprise the output video signal, such that a region between the display areas on a monitor does not contain any input video signal. This region is filled by the switcher will a simple mono-color video signal, internally generated by the switcher.

There are a number of standard border types generated for use in creating wipe effects. The simplest type is an instantaneous transition line between two regions of a display of the video signals on a monitor. This can be referred to as a hard transition with no border. Another type is an instantaneous transition between the two regions with a colored area of variable width between them. This type of border is called a hard transition with a colored border. Yet another type of border has a dissolve-like border between the two regions. In this area both video signals are present but at reduced levels. This type of border is called a soft transition with no colored border. Soft and hard transitions and colored borders can be combined in various ways to produce three other border types. A soft transition on both regions to a colored border is called a halo border. A soft transition on one region to the colored border and a hard transition from the other region to the colored border is called a half halo. If the border is a closed geometric figure, such as a circle or a box, a soft outside transition, between the region surrounding the closed geometric figure and the border, and hard inside transition, between the border and the region inside the closed geometric figure, is called a half halo. Conversely, a hard outside and soft inside transition is referred to as a reverse half halo.

To produce this variety of border types has required complex, specialized circuitry. To the circuitry used to produce a hard color border, additional circuitry must be added to produce each desired effect. Such circuitry is expensive, complex to design and manufacture, and difficult to maintain. Perhaps more importantly, such complex specialized circuitry introduced gain and timing discrepancies because of their complexity and lack of commonality in processing. These discrepancies degrade visual performance.

These control signals are commonly generated separately. When the video regions that are controlled by these control signals are assembled, as when displayed on a monitor, they do not form clean transition boundaries. This produces wipes with bad transition regions, which is considered very undesirable to the user.

As a result of these problems, there is a need for an apparatus or method that is less complex. Such an apparatus or method desirably also can generate all the required border types to allow commonality in signal processing. Further, such an apparatus or method should provide for a good fit between the regions on a monitor display when the input video signals are mixed in the video mixer.

SUMMARY OF THE INVENTION

The present invention overcomes these problems by producing two waveform control signals and a border waveform control signal for use in a mixer to produce a variety of borders for video wipes. The present invention generates control signals that offer excellent linearity, and handle a full selection of border types in a similar fashion to significantly reduce timing and signal gain discrepancies while keeping circuit complexity low.

The present invention uses a pair of horizontal and vertical voltage ramps to produce the video wipe with the desired borders. A horizontal control ramp signal is produced at a horizontal video rate. Similarly, a vertical control ramp signal is produced at a vertical video rate.

A ramp combiner produces a composite waveform control signal from the horizontal and vertical ramp signals. A wipe selection signal is used by the ramp combiner to combine the ramps to define a particular wipe selection such as a line wipe, a box wipe, or a rotating clock wipe.

The composite waveform control signal is inputted to a base waveform generator. The term base waveform refers to a waveform signal that is the base for other signals. The generator uses this one signal and produces four output signals. Using a common source for all the control signals, reduces time and signal path discrepancies. It produces a first base waveform signal and a second base waveform signal and their respective inverse signals. The second base waveform signal and its inverse are increased in magnitude. The first base waveform signal and its inverse are between zero volts and a reference voltage and the second base waveform signal and its inverse are between minus the reference voltage to plus the reference voltage. The base waveform generator also receives signals controlling soft or hard edges and the border width.

These four base waveform control signals are inputted to a selector which selects two of the signals for final processing. The selection of signals determines what type of border is generated.

Two limiters each produce a video control signal by limiting the video control signals which are inputted to a video mixer. The purpose of the limiter is to take advantage of waveform geometry in combining signals of increased magnitude with signals of normal magnitude. While these signals could be generated separately, commonality of the processing path would be lost. It is this commonality of processing that assures a good fit between regions displayed on a monitor. The method of increasing magnitude and later limiting obviates the need for additional signals to be generated by separate circuitry.

The two video control signals are added together and subtracted from the reference voltage by a summer to form the border control signal. By producing the border signal from the two video control signals, a good fit between the regions is assured, because by definition the border is the remainder of the two regions. The border control signal is also inputted to the video mixer.

The video mixer, with its built in color generator and using the three video control signals, produces an output video signal from two input video signals.

Various of the above-mentioned and further features and advantages will be apparent from the specific examples described hereinbelow of an exemplary apparatus, and method.

BRIEF DESCRIPTION OF THE DRAWINGS

FIG. 2 is a table showing various waveforms produced by the circuitry of FIG. 1.

DETAILED DESCRIPTION

Figure 1:
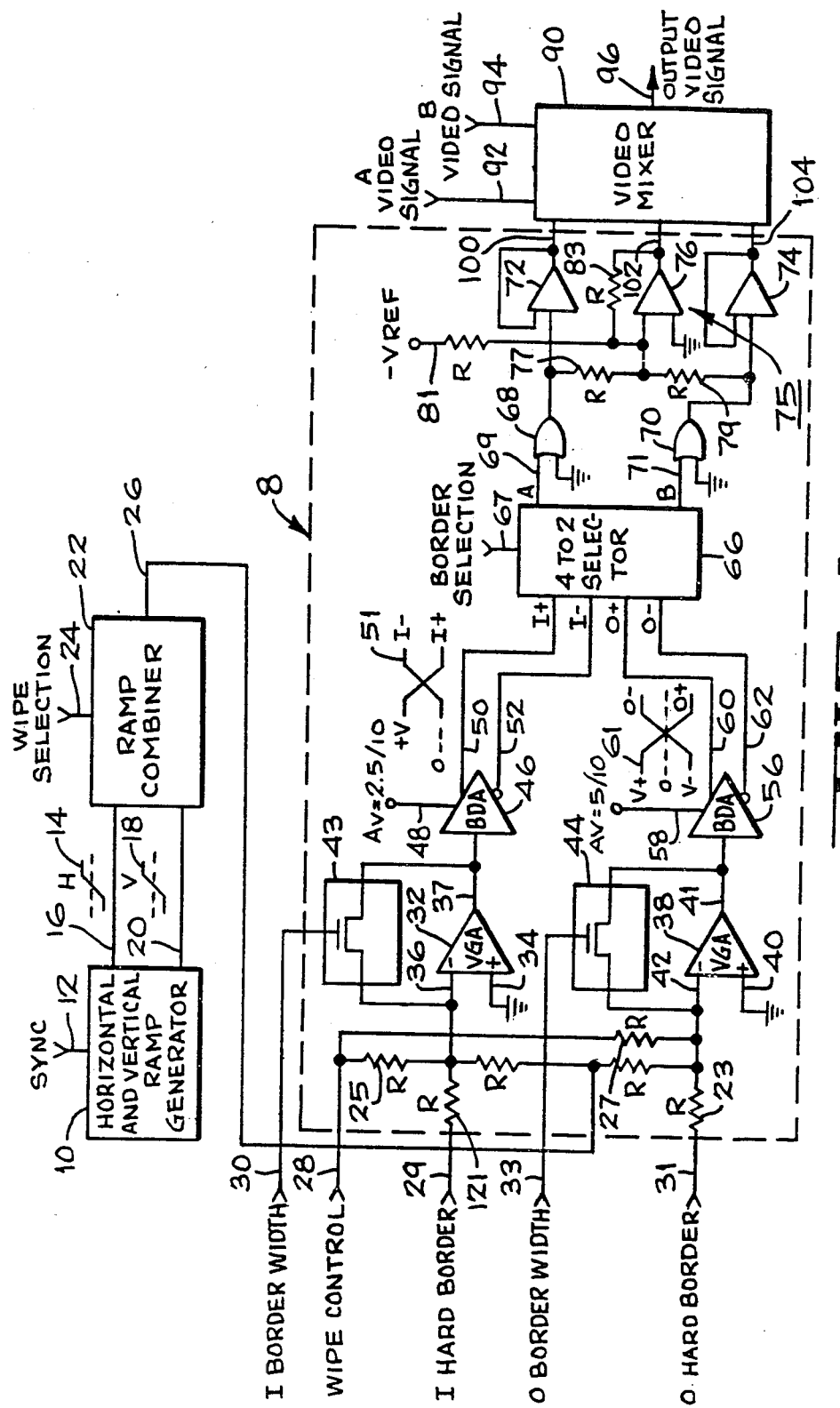
FIG. 1 is a schematic representation of circuitry for generating signals for a variety of border types in accordance with this invention.

Referring to FIG. 1, the following is a description of the elements of the circuit and their interconnection.

A sync signal 12, related to all the video signals involved with the video switcher, is fed into a horizontal and vertical ramp generator 10. This sync signal 12 can be produced either by the switcher itself or by a sync generator for an entire video system. Using sync signal 12 as a timing reference, the generator produces two voltage ramps, a horizontal control ramp 16 and a vertical control ramp 20. These ramps are shown in graphs 14 and 18.

Video signals have both a horizontal and vertical scanning period. The horizontal ramp 14 should a have a period of the horizontal video rate, which for a standard NTSC signal is 63.5 microseconds. The vertical ramp 16 must a have a period of the vertical video rate, which for a standard NTSC signal is 16.6 milliseconds. This relationship relates to the time it takes to do one horizontal video scan as compared to the time it takes to do one vertical video scan. Ramp generators 12 and 14 are of common design as can be easily constructed by one skilled in the art or can be purchased as a readily available integrated circuit package.

The output from the horizontal ramp generator 10, is fed into a ramp combiner 22. Ramp combiner 22 takes both the horizontal and vertical ramp control signals, 16 and 20, and combines them to form a composite waveform signal 26. A wipe selection signal 24 is also inputted to the ramp combiner 22. The wipe control signal 24 can originate at the control panel of the switcher or be created by a logic control system. The ramp combiner 22 produces the composite waveform signal 26 such that it defines a type of video wipe, such as a box wipe, a circle wipe, a rotating clock wipe, or a line wipe. Such ramp combiners are common in the switcher art and can be constructed by a person skilled in the art.

The composite waveform signal 26 from the ramp combiner 22 is fed into the output signal generator 8, which comprises all the circuitry shown in the dashed box. The purpose of this circuitry is to produce waveform control signals 100, 102, and 104, that are used by the video mixer 90 to produce an output video signal 96.

The composite waveform signal 26 is fed into the minus inputs, 36 and 42, of variable gain amplifiers 32 and 38. From these two paths, and I base control signal 37 and an O base control signal 41, are generated. The term base control signal refers to a signal that is the base for the creation of other signals. When a closed wipe, such as a box or a circle wipe, is produced, the I base signal is used for the inside transition line and the O base signal is used for the outside transition line. In a wipe that is not closed, such as a line or clock wipe, the I and O base signals can be used interchangeably.

Five other control signals are also used by the output signal generator 8, and are described below.

Two border width signals, 30 and 33, are fed to gain elements 43 and 44. These signals originate from a logic control system and/or a control panel (not shown). They are used to determine the width of the transition region.

A wipe control signal 28 also originates from the logic control system or control panel. This signal determines the progress of the wipe on the screen. If a fader lever is used to control the wipe, this signal would have a voltage related to the position of the lever. The wipe control signal is fed through resistors, 25 and 27, and into the variable gain amplifiers, 32 and 38, along with the composite waveform signal 26.

The last two signals are the I and O hard border signals, 29 and 31. These signals are used only to create hard borders by off-setting the I channel negatively and the O channel positively with respect to the wipe control signal. For other border/transition types the hard border signals, 29 and 31, have no voltage on them and the variable gain amplifiers, 32 and 38, will produce a soft transition line. The I and O hard border signals, 29 and 31, are fed through resistors, 121 and 23 respectively, into the minus inputs, 36 and 42, of variable gain amplifiers 32 and 38, along with the above mentioned signals.

Variable gain amplifiers, 32 and 38, have their positive inputs, 34 and 40, tied to ground. Both the minus inputs and the outputs of variable gain amplifiers, 32 and 38, are connected to gain elements, 43 and 44, respectively. The gain elements, 43 and 44, are composed of FET transistors. The purpose of gain elements, 43 and 44, are to adjust the width of the color border when one is selected. The gain elements, 43 and 44, are controlled by the border width signals, 30 and 33.

The outputs, 37 and 41, from the variable gain amplifiers, 32 and 38 are called the I and O base waveform control signals. They are fed to balanced differential amplifiers 46 and 56. Balanced differential amplifiers, 46 and 56, serve two functions. The first function is to produce an inverted and non-inverted base waveform control signal. Balanced differential amplifier 46 produces I−, 52, which is the inverted I base waveform control signal, and I+, 50, which is the non-inverted I base waveform control signal. Balanced differential amplifier 56 produces O−, 62, which is the inverted I base waveform control signal, and O+, 60, which is the non-inverted I base waveform control signal.

The second function of balanced differential amplifiers, 46 and 56, is to adjust the magnitude of the I and O base waveform control signals. This is controlled by two $A_v$ voltage inputs, 48 and 58. For balanced differential amplifier 46, $A_v$ is one half what it is for balanced differential amplifier 56. The effect of this difference is that the output signal from balanced differential amplifier 46 is between zero and a reference voltage V, as shown in graph 51, which the output signal from balanced differential amplifier 56 is between minus the reference voltage V and plus the reference voltage V, as shown in graph 61. The reference voltage V is preferably approximately 3 volts.

These four base waveform control signals, I+, 50, I−, 52, O+, 60, and O−, 62 are fed into 4 to 2 selector 66. The purpose of selector 66 is to select an A and B video waveform control signal, from among the four input signals according to a border selection signal 67. The border selection signal can originate from the control panel or logic controller of the switcher. Selector 66 can be implemented in a number of ways by a person skilled in the art, such as two 4 to 1 selectors, which is the preferred method. These analog selectors are commercially available in integrated circuit packages.

The A and B video waveform control signals are fed into one of the inputs of limiters 68 and 70, respectively. The preferred implementation of limiters, 68 and 70, is by using an analog OR gate with one input tied to ground. The result of such an arrangement is to limit the A and B video control waveforms to above zero volts. Analog gates are common in the art and can be constructed by one skilled in the art.

The limited A and B video waveform signals are combined and subtracted from the reference voltage V by border circuit 75. In border circuit 75, the limited A and B waveform control signals are connected to an input of an operational amplifier 76 through separate resistors, 77 and 79. Also connected to this input of operational amplifier 76, is the minus reference voltage through resistor 81, and the output of operational amplifier 76, through resistor 83. The second input to operational amplifier 76 is connected to ground. The output of this circuit is called the border video control signal 102.

Limited A and B video signals are also fed through matched operational amplifiers, 72 and 74, respectively. The purpose of these amplifiers is to match signal paths with border video control signal 102. The output of each operational amplifier, 72 and 74, is fed back to its other input.

A and B video control signals, 100 and 104, and border video waveform signal 102 are fed to video mixer 90. Using these signals, the output video signal 96 is produced from an A input video signal 92 and a B input video signal 94. The output video signal 96 can be used with a video utilization device such as a monitor, video tape recorder, or a video broadcast system.

Referring again to FIG. 1, the following is an operational description of the present invention.

The horizontal and vertical ramp generator 10 produces both a horizontal control ramp 16, shown in graph 14, and a vertical control ramp 20, shown in graph 18. These ramps are synchronized with sync signal 12. Such synchronization can easily be accomplished by one skilled in the art. Both control ramp signals are fed into ramp combiner 22 which combines the horizontal and vertical control ramps, 16 and 20, into a composite waveform which defines a wipe, such as a line, box or clock type wipe. The wipe selection signal 24, controls the type of wipe which is used. The composite waveform signal 26 is fed to the output signal generator 8.

The composite waveform signal 26 is ued to produce I and O base waveform signals, 37 and 41, respectively. The composite waveform signal is fed into both voltage gain amplifiers, 32 and 38, along with the wipe control signal 28 and I hard border signal 29, and O hard border signal 31. The output of each voltage gain amplifier, 32 and 38, is fed into the gain elements, 43 and 44, and back into the inputs of voltage gain amplifiers 32 and 38. The gain elements 43 and 44 are controlled by the I border width signal 30 and the O border width signal 33, respectively. In operation, the wipe control signal 28 provides a voltage ramp related to the progress of the wipe, from start to finish. The I and O hard border signals, 29 and 31, are used when a hard border is desired. When a hard border is not selected, the voltage gain amplifiers, 32 and 38, provide a sloped transition between the input video signals. When a hard border is selected, there is a sharp vertical transition. The border width signals, 30 and 33, control the gain elements, 43 and 44, to adjust the width of the border or transition region between the two input video signals. These concepts will be further explained with the description of FIG. 2.

The outputs of the voltage amplifiers, 32 and 38, are the I and O base waveform signals. If sent to the mixer at this point one of these signals could control a wipe without a border. The circuitry from this point is to produce the border control signal necessary to produce a variety of border types. The preferred method of creating these borders types is to produce a variety of base waveforms and combine them to create the video control signals and the border control signal.

The I and O base waveform signals, 37 and 41, are fed into balanced differential amplifiers, 46 and 56, respectively. These amplifiers each produce an inverted and a non-inverted output signal. Balanced differential amplifier 56 adjusts the magnitude of the O signal so that it is between minus the reference voltage to plus the reference voltage. Balanced differential amplifier 46 adjusts the I signal so that it is between zero and plus the reference voltage. The purpose of adjusting the I and the O signals differently is to take advantage of some simple geometric relationships that will be further explained in the description of the waveforms in FIG. 2.

The four base waveform signals are fed into selector 66 so that A and B video control signals can be selected. A and B video control signals are limited below zero by analog OR gates 68 and 70. The resulting signals, 100 and 104, are sent to the video mixer 90 along with the border video control signal 102. Border video control signal 102 is produced by subtracting both A and B video control signals from the reference voltage. It is because the border control signal is generated from the A and B video control signals, 69 and 71, that the mixer produces a good fit between the parts of the output video picture.

The A and B video control signals, 100 and 104, and the border control signal 102 are inputted to video mixer 90. Using these signals, video mixer 90 produces an output video signal 96 from A and B input video signals, 92 and 94.

Referring now to FIG. 2, a table of waveforms is shown. Down the first column, labeled "Video Control Signals", are listed five signals types. The first two are the A and B video control signals, before being limited, which correspond to signals 69 and 71 of FIG. 1. The second two are limited A and B video control signals, 100 and 104 of FIG. 1. The last signal listed is border video control signal 102 of FIG. 1.

The next five vertical columns are representations of the signals necessary to produce the described borders. The signals shown in this table are not to scale and are only representative of the signal shapes that may be used to create a variety of wipes. All the waveforms are based on the control of one raster scan for each input video. These signals would be used to turn off and on the raster scan for the related video input signal. These waveforms represent a one dimensional view of a two dimensional process. When the signal is at zero volts, that input signal is turned off. When it is at the reference voltage V, that signal is turned on. If the signal jumps from zero to V or vice versa, that will produce a hard edge as shown in all the waveforms of the first column. If the transition between zero and V is a sloped line, there will be a soft transition between that signal being on and off. Example of soft transitions can be seen in the second column of waveforms.

For example, refer to the last three waveforms in the second column labeled "HARD, hard edge, colored border." Note that the A video control signal starts off and turns on for a period and then turns off again, while the B video control signal starts on and turns off before the A signal turns on, and then turns on after the A signal has turned off. When these signals are limited and added together and then subtracted from the reference voltage V, they produce the border video control signal shown in the bottom waveform of that column. The border video control signal turns on just as the B signal turns off, then turns off just as the A signal turns on, then turns on just as the A signal turns off, and finally turns off just as the B signal turns on. The signals shown would produce a single scan that would start with the B video signal on at the right edge of the screen, then switching to the color border, then switching to the A video signal, then switching back to the color border, and finally switching back to the B video signal. It is important to understand that these control signals may be more complex for more complex wipes. If fact, from these signal scan control signals, it is impossible to know what the entire, full screen wipe looks like. What is important to see in the waveforms of FIG. 2 is the relationship between the waveforms, more than the waveforms themselves.

Starting with the first column of waveforms labeled "HARD, hard edge, color border", the I and O border width signals 30 and 33 of FIG. 1, are both fully on for maximum gain from the variable gain amplifiers 32 and 38, producing a sharp transition between the zero and the reference voltage V. Voltage controls $A_v$, 48 and 58 are also set for maximum gain to sharpen the transition. The I hard border signal 29 and the O hard border signal 31 offset the composite pattern signal 26 with respect to the wipe control signal 28 in opposite directions. This defines the hard border width. These signals are only used for hard borders. The selector 66 of FIG. 1 selects I+ and O− as the A and B video control signals as shown in the first two waveforms in the HARD column. When limited by limiters, 68 and 70, the I+ is unaffected, but the O− signal is limited at zero. These two signals are shown as the third and fourth waveforms of the HARD column. The border control signal 102 from the border circuit 75 is shown as the bottom waveform in the HARD column.

In the column marked "SOFT, soft edge, no color border", only the I base waveform video control signal is used. The I hard border signal 29 is off, so there is no hard border offset relative to the wipe control signal. The transition is slowed down becoming a sloped line by decreasing the I border width signal 30 and thus the gain of variable gain amplifier 32 through gain element 43. Also, the $A_v$ control voltage 48 is set at minimum gain of 2.5. As discussed above, this sloped line will producea soft transition between the picture areas. The selector 66 outputs I+ as the A video control signal 69 and I− as B video control signal 71. Both these signals pass through the limiters 68 and 70 without being limited because their peak to peak voltage was already between zero and the reference voltage V. When added together and then subtracted from zero, the border circuit generates a border control signal 102 that is at zero volts. This means there will be no border between the A and B video pictures.

The column labeled "HALO, soft edge, color border" represents the waveforms necessary to produce transitions between A and B video pictures where B video has a soft transition to a color border, and the color border has a soft transition back to the A video pictures. Only the O base waveform signal is used to produce this border. The O border width signal 33 is used to reduce the gain in the variable gain amplifier 38, resulting in a sloped transition between zero and the reference voltage V defining a soft screen transition. Also, the $A_v$ control voltage 58 is set at a minimum gain of 5. Selector 66 outputs O+ as the A video control signal and O− as the B video control signal. Both these signals are limited by analog OR gates 68 and 70. The result of the limitation demonstrates the advantages of increasing the magnitude of the O signals and then limiting them. While the A and B video control signals are simply the inverse of each other, when limited, they form two different waveforms. When the limited A and B waveforms are added together and subtracted from the reference voltage V, they produce a border video control signal that produces the soft edge between the B video picture and the color border, and a soft edge between the border and the A video picture, as desired. As the gain of the variable gain amplifier 38 is varied, the color border's width increases or decreases around the center point. By taking advantage of this relationship between the O waveform signals and limited O waveform control signals, the desired variety of border type can be generated with only a two base signal. Without this method, separate waveform control signals must be generated for each desired border, which increases circuit complexity and decreases commonality of waveform signal processing.

The column labeled "½HALO, soft and hard edge, color border" illustrates the waveforms necesary to produce a border type where the B video picture has soft transition to the color border and the color border has a hard transition to the A video picture. In this case, the I border width signal 30 is fully on for maximum gain of variable gain amplifier 32 and control voltage $A_v$ 48, resulting in a fast transition between zero volts and the reference voltage V, defining a hard transition between the color border and the A video picture. The O border width signal 33 is used to vary the sloping transition between zero and the reference voltage V, defining a soft transition between color border and the B video picture. The selector 66 outputs I+ as the A video control signal and O− as the video control signal. Again, the limitation of the O− signal as B video control signal, takes advantage of the geometric relationship between O waveform signal and the limited O waveform control signal. When the A and B video control signals are inputted to the border circuit 75, a border video control signal is produced that has a soft transition from the B video picture and a hard transition to the A video picture, as desired.

As with the previous column, the column labeled "REVERSED ½ HALO, hard and soft edge, color border" illustrates the waveforms necessary to produce a border type where the B video picture has hard transition to the color border and the color border has a soft transition to the A video picture. In this case, the I border width signal 30 is fully on, resulting in a vertical transition between zero volts and the reference voltage V, defining a hard transition between the color border and the B video picture. The O border width signal 33 is used to vary the sloping transition between zero and the reference voltage V, defining a soft transition between color border and the A video picture. The selector 66 outputs O+ as the A video control signal and I− as the B video control signal. Again, the limitation of the O+ signal as A video control signal, takes advantage of the geometric relationships between the O waveform signal and the limited O waveform control signal to produce a waveform that would otherwise have to be separately generated. When the A and B video control signals are inputted to the border circuit 75, a border video control signal is produced that has a hard transition from the B video picture and a soft transition to the A video picture, as desired.

While the embodiments disclosed herein are preferred, it will be appreciated that they are merely examples, and that various alternatives, modifications, variations or improvements thereon may be made by those skilled in the art from this teaching, which are intended to be encompassed by the following claims.

What is claimed is:

1. Apparatus for producing an output video signal from at least two input video signals according to a selected wipe and border, comprising:
    control waveform generating means for producing a composite waveform signal in response to a sync signal which synchronizes said composite waveform signal with said input video signals, and in response to a wipe selection signal, said composite waveform signal defining said selected wipe between said input video signals;
    a border generator for producing at least two video control signals of respective magnitudes and a border video control signal in response to said composite waveform signal and a plurality of border-defining video control signals indicative of said selected border, wherein said border video control signal corresponds to a difference between said respective magnitudes of said video control signals; and
    a video signal mixer for producing said output video signal from said input video signals in response to said video control signals and said border video control signal.

2. The apparatus of claim 1, wherein said control waveform generating means further comprises:
    ramp generating means for producing a horizontal control ramp signal at a standard horizontal video rate and a vertical control ramp signal at a standard vertical video rate, said standard horizontal and vertical video rates being defined by said input video signals; and
    ramp combining means receiving said horizontal and vertical control ramp signals and responsive to a wipe selection signal for producing a composite waveform control signal defining said selected video wipe.

3. The apparatus of claim 1, wherein said border generator further comprises:
    base waveform generating means responsive to said composite waveform signal for producing a first base waveform control signal and its inverse, and for producing a second base waveform control signal and its inverse, said second base waveform control signal and its inverse having magnitudes greater than said first base waveform control signal and its inverse, respectively;
    selecting means receiving said first and second base waveform control signals and their inverses for selecting, according to said selected border, at least two video waveform control signals;
    limiting means for producing at least two video control signals by limiting said two video waveform control signals which define said selected border; and
    summing means responsive to said two video control signals for producing said border video control signal.

4. Apparatus for producing a selected video wipe with a selected border from at least two input video signals having a horizontal video rate and vertical video rate, comprising:
    ramp generating means for producing a horizontal control ramp signal at said horizontal video rate and a vertical control ramp signal at said vertical video rate;
    ramp combining means receiving said horizontal and vertical control ramp signals and a wipe selection signal for producing a composite waveform signal defining said selected video wipe;
    base waveform generating means responsive to said horizontal and vertical control ramp signals for producing a first base waveform control signal and its inverse, and for producing a second base waveform control signal and its inverse, said second base waveform control signal and its inverse having magnitudes greater than said first base waveform control signal and its inverse, respectively;
    selecting means receiving said first and second base waveform control signals and their inverses for selecting, according to said selected border, at least two video waveform control signals;
    limiting means for producing at least two video control signals by limiting said two video waveform control signals which define said selected border;
    summing means responsive to said two video control signals for producing a border control signal from said video waveform control signals; and
    video mixing means responsive to said two video control signals and said border control signal for producing an output video signal from said input video signals.

5. A method of producing an output video signal from at least two input video signals according to a selected wipe and border, comprising the steps of:
    generating a composite waveform signal in response to, a sync signal which synchronizes said composite waveform signal with said input video signals, and a wipe selection signal, said composite waveform signal defining said selected wipe between said input video signals;
    generating at least two video control signals of respective magnitudes and a border video control signal in response to said composite waveform signal and a plurality of border-defining control signals indicative of said selected border, wherein said border video control signal corresponds to a difference between said magnitudes of said video control signals; and
    mixing said output video signal from said input video signals in response to said video control signals and said border video control signal.

6. The method of claim 5, wherein said step of generating a composite waveform signal comprises the steps of:
    generating a horizontal control ramp signal at a standard horizontal video rate and a vertical control ramp signal at a standard vertical video rate, said standard horizontal and vertical video rates being defined by said input video signals; and
    combining said horizontal and vertical control ramp signals in response to a wipe selection signal for producing the composite waveform signal defining said selected video wipe.

7. The method of claim 6, wherein said step of generating at least two video control signals and a border video control signal comprises the steps of:

generating a first base waveform control signal and its inverse, and generating a second base waveform control signal and its inverse, from said composite waveform signal, said second base waveform control signal and its inverse having magnitudes greater than said first base waveform control signal and its inverse, respectively;

selecting at least two video waveform control signals from said first and second base waveform control signals and their inverses, in response to said selected border;

providing at least two video control signals by limiting said two video waveform control signals which define said selected border; and summing said two video control signals for producing said border control signal.

8. A method of producing a selected video wipe with a selected border from at least two input video signals having a horizontal video rate and vertical video rate, comprising the steps of:

generating a horizontal control ramp signal at said horizontal video rate and a vertical control ramp signal at a vertical video rate;

combining said horizontal and vertical control ramp signals and a wipe selection signal to provide a composite waveform signal defining said selected video wipe;

producing a first base waveform control signal and its inverse, and producing a second base waveform control signal and its inverse, said second second base waveform control signal and its inverse having magnitudes greater than said first base waveform control signal and its inverse, respectively;

selecting said first and second base waveform control signals and their inverses to provide, according to said selected border, at least two video waveform control signals;

limiting said two video waveform control signals which define said selected border to produce at least two video control signals;

summing said two video control signals to produce a border video control signal from said video waveform control signals; and mixing said two video control signals and said border video control signal to provide an output video signal from said input video signals.

9. Apparatus for producing an output video signal from at least two input video signals, comprising:

control signal generating means for producing a composite waveform signal;

border generator means for producing at least two video control signals of respective magnitudes and a border control signal in response to said composite waveform signal, wherein said border control signal corresponds to a difference between said respective magnitudes of said video control signals; and video signal mixer means for producing said output video signal from said input video signals in response to said video control signals and said border control signal.

* * * * *